(12) United States Patent
Hus et al.

(10) Patent No.: US 8,190,098 B2
(45) Date of Patent: May 29, 2012

(54) PACKET DATA MULTICAST COMMUNICATION SYSTEM, A STATION, AND A METHOD OF OPERATING THE SYSTEM

(75) Inventors: Olivier J-M. Hus, Redhill (GB);
Matthew P. J. Baker, Canterbury (GB);
Timothy J. Moulsley, Caterham (GB);
Paul Bucknell, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 265 days.

(21) Appl. No.: 10/586,806

(22) PCT Filed: Jan. 20, 2005

(86) PCT No.: PCT/IB2005/050242
§ 371 (c)(1),
(2), (4) Date: Jul. 21, 2006

(87) PCT Pub. No.: WO2005/071887
PCT Pub. Date: Aug. 4, 2005

(65) Prior Publication Data
US 2008/0232291 A1    Sep. 25, 2008

(30) Foreign Application Priority Data

Jan. 23, 2004  (GB) .................................. 0401467.6
Jul. 23, 2004  (GB) .................................. 0416475.2

(51) Int. Cl.
*H04B 1/00* (2006.01)
(52) U.S. Cl. .... 455/69; 455/522; 455/452.2; 455/550.1; 455/561; 370/312; 370/328; 370/338; 370/395.21
(58) Field of Classification Search .................. 455/513, 455/517, 452, 69, 560–563, 502–503, 41.2, 455/452.2, 522; 370/320, 328, 338, 312, 370/342, 394, 474, 390, 395.21; 714/749, 714/774, 750
See application file for complete search history.

(56) References Cited

U.S. PATENT DOCUMENTS
5,553,083 A    9/1996  Miller et al.
(Continued)

FOREIGN PATENT DOCUMENTS
EP    1 154 660    11/2001
(Continued)

OTHER PUBLICATIONS

Yamauchi Y Ed—Ng C S et al: "On the Packet Radio Multicast Scheme for the Personal Communications Era"; Singapore ICCS '94; Conference Proceedings Singapore Nov. 14-18, 1994; N.Y. USA; IEEE US vol. 2 Nov. 14, 1994; pp. 576-580.

(Continued)

*Primary Examiner* — Nick Corsaro
*Assistant Examiner* — Babar Sarwar

(57) ABSTRACT

A method of operating a packet data multicast communication system which comprises a network or NodeB (BS) and a plurality of mobile stations (MS1, MS2, MS3). The network and the mobile stations have transceiving equipment (14, 34) for the transmission of data packets on a downlink between the network and mobile stations, and feedback signalling (ACK/NACK) on an uplink. The mobile stations have means for receiving a data packet transmitted by the first station, means (46) for measuring the quality of reception, means (30, 48) for determining into which one of at least three predetermined quality ranges the measured quality falls. Each of the at least three predetermined quality ranges represents a respective transmitter behavior of the first station and the transmitter behavior corresponding to at least two non-contiguous ones of the quality ranges is identical.

20 Claims, 2 Drawing Sheets

U.S. PATENT DOCUMENTS

Figure 1:
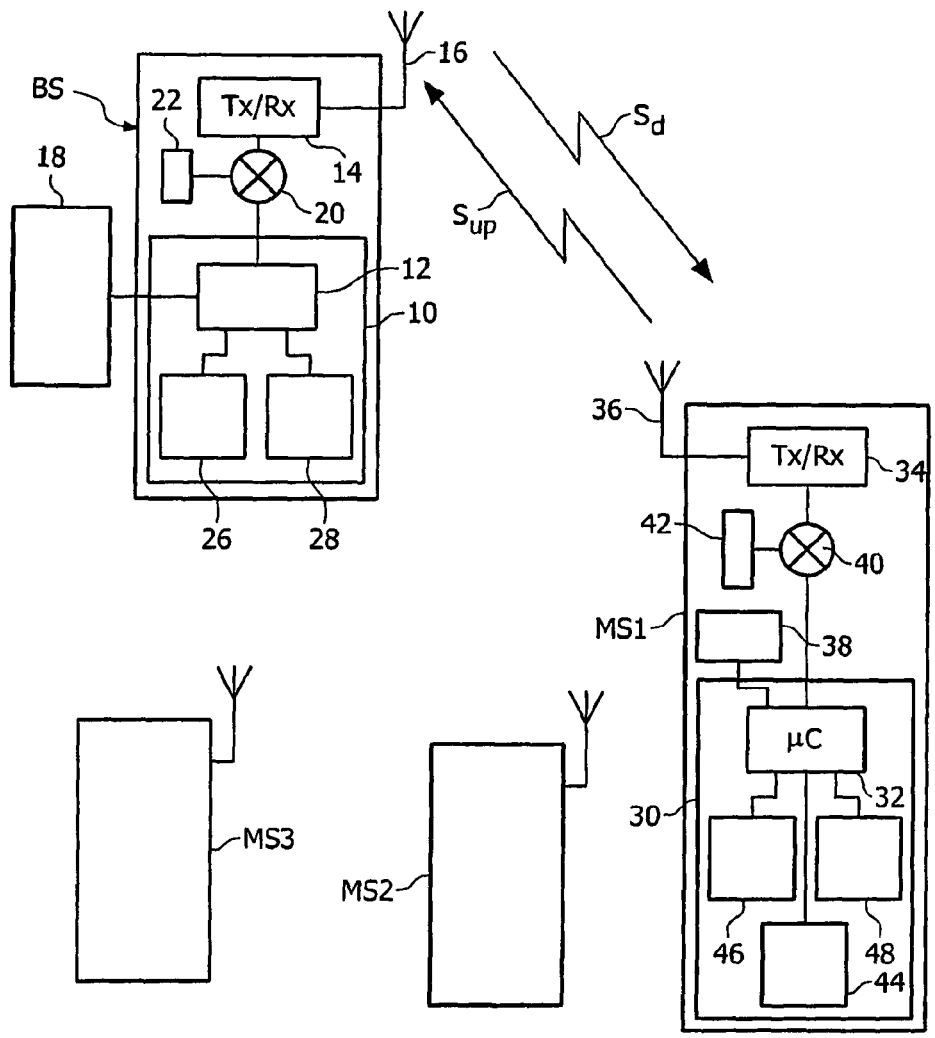

| | | | |
|---|---|---|---|
| 7,388,919 B2 * | 6/2008 | Varma et al. | 375/259 |
| 2002/0003798 A1 * | 1/2002 | Sato et al. | 370/390 |
| 2002/0168945 A1 * | 11/2002 | Hwang et al. | 455/69 |
| 2003/0058821 A1 | 3/2003 | Lee et al. | |

FOREIGN PATENT DOCUMENTS

| | | |
|---|---|---|
| JP | 2001320324 A | 11/2001 |

OTHER PUBLICATIONS

Pejhan S et al: "Error Control Using Retransmission Schemes in Multicast Transport Protocols for Real-Time Media"; IEEE / ACM Transactions on Networking IEEE Inc. N.Y. US; vol. 4 No. 3; Jun. 1, 1996; pp. 413-427.

* cited by examiner

PACKET DATA MULTICAST COMMUNICATION SYSTEM, A STATION, AND A METHOD OF OPERATING THE SYSTEM

The present invention relates to a packet data multicast communication system, a station for use therein and a method of operating the system. More particularly the present invention relates to communication systems requiring acknowledgement mechanisms for feedback signalling in retransmission schemes. The present invention has particular, but not exclusive, application to cellular telephone systems such as UMTS (Universal Mobile Telecommunication System).

Retransmission schemes for the reliable delivery of data in multicast, that is point-to-multipoint, configurations are required In communications systems such as UMTS (Universal Mobile Telecommunication System). Such schemes usually imply the use of some form of feedback mechanism between the user equipments (UEs) and the network (NodeB), which can result in a high amount of feedback signalling when the number of UEs is large.

The concept and mode of operation of a downlink retransmission scheme with an uplink feedback mechanism is easily understood. Typically the NodeB sends data on the downlink channel to the UEs belonging to a particular multicast group. The uplink feedback mechanism in the UE can take two forms, firstly, "positive" acknowledgment (ACKs) when the UE receives a multicast packet correctly, indicating no need to retransmit, and secondly, "negative" acknowledgement (NACKs) when the UE detects some packet error or loss, indicating a need, or a request, to retransmit that piece of data. Upon receiving the NACKs, the NodeB can assess whether data retransmission is necessary or not.

A problem emerges when looking at the decision-making process to establish whether to perform retransmissions. For example if a particular UE suffers from a bad radio channel, then it will always be requesting retransmissions. As such, any other feedback signalling coming from other UEs, whether indicating the same request for retransmission or not, would be redundant, as it would just be indicating the same need for a particular retransmission. It would also potentially be a waste of channel resources when the number of UEs is high. More generally, if a particular group of UEs are bad receivers and trigger retransmissions, then it would be redundant for other UEs to repeat the same request, unless they provided some additional information. If only a small proportion of UEs is requesting retransmissions, it may be undesirable to waste significant downlink resources retransmitting packets to those UEs.

An object of the present invention is to improve the efficiency of operating a multicast communication network.

According to a first aspect of the present invention there is provided a method of operating a packet data multicast communication system comprising a first station and a plurality of second stations, the first and second stations having transceiving equipment for communication between the first and second stations, the method comprising the first station transmitting a data packet and at least one of the plurality of the second stations receiving the data packet, characterised by the at least one of the plurality of second stations measuring the quality of reception of the received data packet, and determining into which one of at least three predetermined quality ranges the measured quality falls, wherein the first station adopts a respective subsequent transmitter behaviour in response to each of the at least three predetermined quality ranges and wherein the subsequent transmitter behaviour corresponding to at least two non-contiguous ones of the quality ranges is identical.

According to a second aspect of the present invention there is provided a packet data multicast communication system comprising a first station and a plurality of second stations, the first and second stations having transceiving equipment for communication between the first and second stations, the first station having means for transmitting data packet, and the second stations having means for receiving the data packet, characterised by the second stations having means for measuring the quality of reception, means for determining into which one of at least three predetermined quality ranges the measured quality falls, and in that the first station has means for adopting a respective subsequent transmitter behaviour in response to each of the at least three predetermined quality ranges, the subsequent transmitter behaviour corresponding to at least two non-contiguous ones of the quality ranges being identical.

According to a third aspect of the present invention there is provided a second station for use in a packet data multicast communication system comprising a first station and a plurality of second stations, the second station having transceiving equipment for communication between the first and second stations and means for receiving a data packet transmitted by the first station, characterised by the second station having means for measuring the quality of reception, and by means for determining into which one of at least three predetermined quality ranges the measured quality falls, wherein each of the at least three predetermined quality ranges represents a respective subsequent transmitter behaviour of the first station and wherein the subsequent transmitter behaviour corresponding to at least two non-contiguous ones of the quality ranges is identical.

The method in accordance with the present invention establishes a selection mechanism by UEs or second stations to influence transmitter behaviour, for example by signalling of retransmission requests according to the quality of signal reception. In order to do that, some form of knowledge of the different levels of "good" or "bad" reception by various UEs or second stations has to be used.

The selective mechanism utilises the transmission of acknowledgements, for example ACKs or NACKs, in the uplink feedback signalling.

The method in accordance with the present invention exploits the fact that UEs will experience different quality of signal or packet reception in a cell, and implements a system of acknowledgements with priorities reflecting that difference.

Different UEs or second stations may apply different thresholds so that the acknowledgements of different priority, for example ACKs or NACKs, can indicate where they fit on a scale of "good" reception for ACKs or "bad" reception for NACKs.

In a typical embodiment, acknowledgements of different priority are transmitted by different UEs or second stations according to the quality of reception of data packets. The first station, for example the network, processes the acknowledgements according to suitable algorithms and adapts the transmitter behaviour accordingly. When, for example, the acknowledgements indicate good reception, no retransmissions are made. This may also be the case when the acknowledgements indicate chronically bad reception. An advantage of not retransmitting data packets when the quality of reception is chronically bad is that the network or first station is able to save a lot of energy by avoiding the necessity of trying to transmit data to second stations which are experiencing an unacceptably bad quality signal. In between these two extremes the first station may decide on one or more retransmissions. Additionally one or more transmitter parameters may be adjusted. Examples of such parameters are number of retransmissions, transmit power, spreading factor, code rate and modulation scheme.

Figure 2:
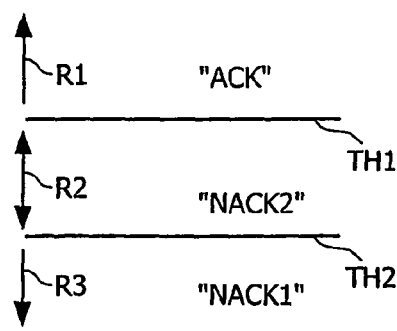
Figure 3:
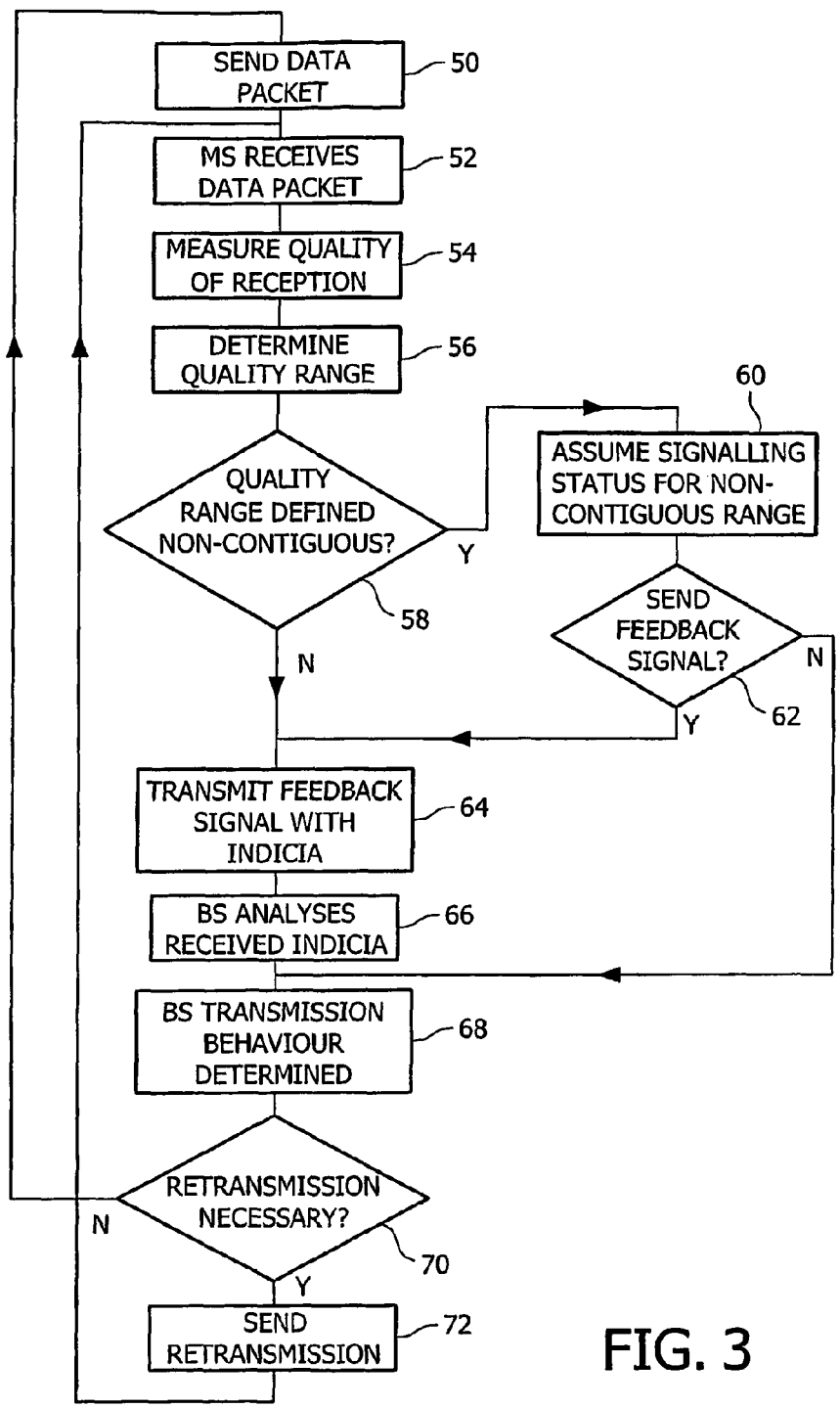

The present invention will now be described, by way of example, with reference to the accompanying drawings, wherein:

FIG. 1 is a block schematic diagram of a multicast communication system made in accordance with the present invention, FIG. 2 illustrates an embodiment of the present invention in which the measured quality of received data packets lies in one of three quality ranges, and FIG. 3 is a flow chart of the operations involved when implementing an embodiment of the method in accordance with the present invention.

Referring to FIG. 1, there is illustrated a radio communication system, for example an UMTS system, comprising a network represented by a base station BS and a plurality of user equipments (UEs) or mobile stations MS1, MS2, MS3. The mobile stations are able to roam within the radio coverage area of the base station(s) and maintain radio communication by way of spread spectrum signalling on downlinks from the base station(s) and uplinks from the mobile stations. As is customary with spread spectrum signalling several signals can be transmitted simultaneously each signal having its own signature or spreading code selected from a set of signatures. Additionally power control has to be effected to prevent weaker signals being swamped by more powerful signals. Accordingly a base station can, amongst a range of transmission parameters at its disposal, specify the maximum power at which a mobile station can transmit on the uplink.

Referring to FIG. 1, the base station BS is controlled by a control module 10 which includes a controller 12 which carries out the many functions involved in the maintenance of the system and the sending and receiving of signals. A transceiver 14 is coupled to an antenna 16 for the transmission and reception of spread spectrum signals. An external source of data 18 is coupled to the controller 12 in which data is formatted into packets. The data packets are prepared for transmission by multiplying them in a multiplier 20 with a signature, for example a pseudo random code, obtained from a code store 22 under the control of the controller 12. The spread spectrum signal is passed to the transceiver 14 for modulation and transmission. For convenience of description the control module 10 is shown to include a transmission parameter store 26 and a transmission protocol store 28 coupled to the controller 12; however, these may be incorporated controller itself.

In the case of a signal received at the antenna 16 it is demodulated and despread by multiplying the demodulated signal with the appropriate signature. Thereafter the despread signal is passed to the controller 12.

The mobile stations MS1, MS2, MS3 are substantially the same and for convenience of description mobile station MS1 will be described. The mobile station MS1 is controlled by a control stage 30 which comprises a microcontroller 32. The control stage carries out the many functions involved in the operation of the mobile station, including the sending and receiving of signals. A transceiver 34 is coupled to an antenna 36 for the reception and transmission, respectively, of downlink and uplink spread spectrum signals $S_d$ and $S_{up}$ from and to the base station BS. A man/machine interface 38, which includes a base band data formatting and deformatting stage, means for inputting data and means for outputting data, is coupled to microcontroller 32. In a transmission mode, a data packet is passed to a multiplier 40 to which is supplied a signature, for example a pseudo random code, obtained from a code store 42 under the control of the microcontroller 32. A signal to be transmitted on the uplink is spread and is passed to the transceiver 34 for modulation and transmission. The control stage is shown to include a RAM 44 for storing data, a stage 46 for measuring the quality of reception of the received data packet and a stage 48 for determining into which one of at least three predetermined quality ranges the measured quality lies, all of which stages are coupled to, or may be incorporated into, the microcontroller 32. The stage 46 determines the quality of reception of the received data packet by comparison of a measure of received data packet quality with predetermined quality metrics.

In the case of a downlink signal $S_d$ received at the antenna 36 it is demodulated and despread by multiplying the demodulated signal with the appropriate signature. Thereafter the despread signal is passed to the man/machine interface 38.

Referring to FIG. 1, from time to time the base station BS uses the downlink to transmit data packets for Multimedia Broadcast and Multicast Services (MBMS) to a plurality of mobile stations. Each of the mobile stations MS measures the quality of reception of the received data packet depending for example on the outcome of a cyclic redundancy check (CRC) evaluation. The microcontroller 32 of the mobile station MS1 determines into which one of at least three quality ranges the measured quality falls. An indication of the allocated quality range may, if appropriate, be forwarded to the base station BS. The indication may comprises an acknowledgement, such as a positive acknowledgement ACK or different levels of negative acknowledgements NACK1, NACK2 . . . NACKn. If appropriate the acknowledgement is sent as an uplink signal $S_{up}$ at a predetermined time interval after the respective data packet transmission so that the base station can associate the acknowledgement with its data packet. In certain situations, described below, it is superfluous actually to transmit an acknowledgement in respect of certain quality ranges because the transmitter's behaviour is the same.

In the case of a large number of UEs or mobile stations MS the quality of reception of transmissions from the base station BS to each mobile station will be different for each mobile station MS and may cover a range from good to bad. In the case of a very bad radio channel there will always be requests for retransmission of data packets and these could lead to a waste of channel resources.

The method in accordance with the present invention makes a more efficient usage of the channel resources by employing a selective prioritising mechanism of acknowledgements, for example ACKs or NACKs, in the uplink feedback signalling. The selection process is based on the quality of signal reception in respective mobile stations MS.

In a typical embodiment, acknowledgements, for example ACKs or NACKs, of different priority can be transmitted by different mobile stations MS according to their reception quality.

FIG. 2 illustrates a simplified scheme having three ranges R1, R2, R3 of signal quality defined respectively by above a first threshold TH1, above a second threshold TH2 and below the first threshold TH1, and below the second threshold TH2. The range R1 relates to acceptable, the range R2 relates to infrequent bad reception (or currently bad reception) and the range R3 relates to chronically bad reception (or currently very bad reception). In the illustrated scheme the feedback signal for the range R1 is ACK, for the range R2 is NACK2 and for the range R3 is NACK1.

The different mobile stations may use one or more values of one or more of the following quality metrics as the thresholds for deciding the ranges of signal quality:

$E_b/N_0$ (energy per bit divided by noise density) over some predetermined time period (e.g. for the most recently received transmission);

the number of packets previously received successfully in a predetermined time window;

the proportion of packets previously received correctly out of a group of a predetermined number of packets;

the received signal to interference ratio (SIR) or signal to noise ratio (SNR) of the data or of another received signal, such as a pilot channel transmitted at a constant power level (e.g. the CPICH (Common Pilot Channel) in UMTS). This could provide an indication of the quality of reception of the downlink channel. A predetermined offset could be applied to the received SIR of the CPICH prior to comparison with the threshold for deciding between NACK1 and NACK2. Such a threshold could be signalled by the network, that is the base station BS, and could correspond to the difference between the transmit power of the CPICH and the transmit power of the packets which are to be acknowledged.

Since an ACK signal does not request the base station BS to retransmit previously transmitted data packets, the protocol may permit a mobile station not to transmit an ACK thereby reducing the overall signal traffic. NACK1 and NACK2 signals may be distinguished in a number of ways, for example by being transmitted at different times, by using different code words, or by using different channels (that is channelisation code and/or scrambling code and/or frequency).

In the case of a chronically bad channel giving rise to many retransmission requests, the operating mode may take the form in which the NACK1 message is either transmitted using exactly the same signal as the ACK messages or not transmitted at all. In other words the transmitter behaviour in response to the measured signal quality lying in the non-contiguous quality ranges R1 and R3 is the same. In this case, the NodeB or base station BS would effectively ignore mobile stations MS which would be likely to require large numbers of retransmissions before they could decode the packets correctly by regarding them as having received signal qualities lying in the range R1. This would enable retransmissions to be avoided when the majority (or some predetermined proportion) of mobile stations did not need them, or when a retransmission was unlikely to be decodable either. By adopting this measure mobile stations can save energy by avoiding trying to decode data packets of an unacceptable quality.

Depending on the types of acknowledgements received, indicating how good or bad reception is, the NodeB or base station BS may take the decision whether to perform retransmissions (or not) in accordance with a number of options. Firstly, always retransmit once, or a predetermined number of times, when receiving NACK1, possibly preventing NACK2 mobile stations from sending their feedback, so as to release uplink resources. Secondly, only retransmit when NACK2 messages are received.

If a NACK1 message is transmitted as a uniquely identifiable signal (that is not identical lo the ACK messages), the NodeB or base station BS may further use the NACK1 messages to assess the proportion of mobile stations which are not receiving the multicast service satisfactorily. This may then be used by the controller 12 to adjust the number of retransmissions, transmit power, spreading factor, code rate, modulation scheme or other parameters of the packet transmissions to increase or decrease general reliability accordingly. These options are contained in the transmission parameter store 26. Typically it may be desirable to ensure that at least 95% of the mobile stations in a cell can receive such an MBMS service satisfactorily.

Other acknowledgement priority configurations and retransmissions options are possible. Also more than three quality ranges may be created, However the transmitter behaviour corresponding to at least two non-contiguous ones of the quality ranges is identical.

Referring to the flow chart shown in FIG. 3, block 50 relates to the node B or base station transmitting data packets on a downlink. Block 52 relates to the mobile stations receiving the data packets and in block 54 the mobile stations measure the quality of reception of the received data packets. Block 56 relates to determining into which one of at least three predetermined quality ranges the measured quality value falls. Block 58 relates to checking if the selected quality range is one of the predefined non-contiguous ranges. If the answer is yes (Y) then in block 60 the mobile station assumes a signalling status for operating in a non-contiguous range, for example range R1 or R3 in FIG. 2. The signalling status includes the options of sending a feedback signal and of not sending anything. In block 62 a check is made to see if a feedback signal is to be sent. If the answer is yes (Y) the flow chart proceeds to block 64. If the answer in the block 58 is no (N), the flow chart also proceeds to the block 68.

The block 64 relates to the mobile station transmitting a feedback signal including indicia indicating the quality range. The indicia may be of any suitable form, for example a predetermined acknowledgement signal such as NACK2 (FIG. 2). Block 66 relates to the base station BS receiving the feedback signal and analysing the received indicia. The flow chart applies the output from the block 66 and the no (N) output from the block 62 to block 68 which relates to the base station determining its transmission behaviour. Block 70 relates to the base station checking whether retransmission(s) of data packet(s) is (or are) necessary. If the answer is no (N) the flow chart proceeds to the block 50. If the answer is yes (Y), the flow chart proceeds to block 72 which relates to the retransmission of data packets the required number of: times. The flow chart thereafter proceeds to the block 52.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of communication systems and component parts therefor and which may be used instead of or in addition to features already described herein.

The invention claimed is:

1. A method of operating a packet data multicast communication system comprising a first station and a plurality of second stations, the first and second stations having transceiving equipment for communication between the first and second stations, the method comprising:

the first station transmitting a data packet and at least one of the plurality of the second stations receiving the data packet, wherein the at least one of the plurality of the second stations measuring the quality of reception of the received data packet, and determining at the plurality of second stations into which one of at least three predetermined quality ranges the measured quality falls, formulating response types based on the determined quality range;

evaluating at the first station a relation between the response types and forming a correspondence to at least two non-contiguous ones of the quality ranges based on the relation; and adopting at the first station a respective subsequent transmitter behaviour based on the correspondence;

wherein the subsequent transmitter behaviour corresponding to at least two non-contiguous ones of the quality ranges is identical, wherein the subsequent transmitter behaviour includes adjusting at least one transmitter parameter of the first station such that the at least one transmitter parameter corresponding to the at least two non-contiguous ones of the quality ranges is identical; and wherein the data packets falling into one quality range influence concurrent or subsequent retransmission decisions regarding the data packets falling into another quality range.

2. A method as claimed in claim 1, characterised by the second station transmitting indicia representative of the quality ranges other than said at least two non-contiguous quality ranges.

3. A method as claimed in claim 2, characterised in that different of the indicia are distinguished by transmission at different times.

4. A method as claimed in claim 2, characterised in that different of the indicia are distinguished by different code words.

5. A method as claimed in claim 2, characterised in that different of the indicia are distinguished by different frequency channels.

6. A method as claimed in claim 1, characterised by the second station transmitting indicia representative of the quality ranges in respect of each of the at least two non-contiguous quality ranges.

7. A method as claimed in claim 1, characterised in that the at least two non-contiguous quality ranges are the best and the worst quality ranges.

8. A method as claimed in claim 1, wherein the measuring of the quality of reception of the received data packet is characterised by comparison of a measure of a predetermined quality metric of a received signal with at least three quality ranges.

9. A method as claimed in claim 8, characterised in that the quality ranges are defined by threshold values applied by respective second stations.

10. A method as claimed in claim 8, characterised in that the quality ranges are defined by threshold values signalled to the second stations by the first station.

11. A method as claimed in claim 8, characterised in that the predetermined quality metric comprises at least one of: $E_b/N_0$ (energy per bit/noise density); the number of data packets received successfully in a predetermined time window; the proportion of data packets previously received correctly out of a group of predetermined number of packets; and the received SIR (Signal to Interference Ratio) or SNR (Signal to Noise Ratio) of another received signal.

12. A method as claimed in claim 11, characterised in that the quality of reception of the received data packet is determined during a predetermined duration.

13. A method as claimed in claim 1, characterised in that the first station adjusts one or more transmission parameters to ensure that at least a predetermined percentage of secondary stations receive a data packet data service satisfactorily.

14. A method as claimed in claim 13, characterised in that the transmission parameters comprise one or more of: number of retransmissions; transmit power; spreading factor; code rate; and modulation scheme.

15. A packet data multicast communication system Comprising:

a first station and a plurality of second stations, the first and second stations having transceiving equipment for communication between the first and second stations, the first station having means for transmitting data packet, and the second stations having means for receiving the data packet, wherein the second stations include:

means for measuring the quality of reception, means for determining, at the plurality of second stations, into which one of at least three predetermined quality ranges the measured quality falls, response types based on the determined quality range, and a relation between the response types for forming a correspondence to at least two non-contiguous ones of the quality ranges based on the relation; and means for adopting at the first station a respective subsequent transmitter behaviour based on the correspondence;

wherein the subsequent transmitter behaviour corresponding to at least two noncontiguous ones of the quality ranges is identical;

wherein the subsequent transmitter behaviour includes adjusting at least one transmitter parameter of the first station such that the at least one transmitter parameter corresponding to the at least two non-contiguous ones of the quality ranges is identical, and wherein the data packets falling into one quality range influence concurrent or subsequent retransmission decisions regarding the data packets falling into another quality range.

16. A system as claimed in claim 15, characterised in that the means for measuring the quality of reception is adapted to compare a measure of a predetermined quality metric of a received signal with at least three quality ranges.

17. A system as claimed in claim 15, characterised in that the first station has means for adjusting one or more transmission parameters to ensure that at least a predetermined percentage of second stations receive a data packet.

18. A system as claimed in claim 17, characterised in that the transmission parameters comprise one or more of: number of retransmissions; transmit power; spreading factor; code rate; or modulation scheme.

19. A second station for use in a packet data multicast communication system, said communication system comprising a first station and a plurality of second stations, the second station having: transceiving equipment for communication between the first and second stations and means for receiving a data packet transmitted by the first station, wherein the second station further includes:

means for measuring the quality of reception, means for determining, at the plurality of second stations, into which one of at least three predetermined quality ranges the measured quality falls, response types based on the determined quality range, and a relation between the response types for forming a correspondence to at least two non-contiguous ones of the quality ranges based on the relation; and means for adopting at the first station a respective subsequent transmitter behaviour based on the correspondence;

wherein the subsequent transmitter behaviour corresponding to at least two noncontiguous ones of the quality ranges is identical;

wherein the subsequent transmitter behaviour includes adjusting at least one transmitter parameter of the first station such that the at least one transmitter parameter corresponding to the at least two non-contiguous ones of the quality ranges is identical, and wherein the data packets falling into one quality range influence concurrent or subsequent retransmission decisions regarding the data packets falling into another quality range.

20. A second station as claimed in claim 19, characterised in that the means for measuring the quality of reception is adapted to compare a measure of received data packet quality with a predetermined quality metric.

* * * * *